May 13, 1958 A. FLAN ET AL 2,834,840

CONTROL MECHANISM TO COORDINATE A SOUND REPRODUCER WITH A PROGRAM SOURCE

Filed May 31, 1956 2 Sheets-Sheet 1

INVENTORS
ANTHONY FLAN
HAROLD N. MILLER
BY George E. Frost
ATTORNEY

INVENTORS
ANTHONY FLAN
HAROLD N. MILLER
BY George E. Frost
ATTORNEY

United States Patent Office 2,834,840
Patented May 13, 1958

2,834,840

CONTROL MECHANISM TO COORDINATE A SOUND REPRODUCER WITH A PROGRAM SOURCE

Anthony Flan, Evanston, and Harold N. Miller, Glencoe, Ill., assignors to Oakton Engineering Corporation, Evanston, Ill., a corporation of Illinois Application May 31, 1956, Serial No. 588,335

5 Claims. (Cl. 179—100.1)

Our invention relates to a control mechanism which will automatically coordinate a main sound program source with a sound reproducer to reproduce an audible program of predetermined duration from the reproducer in response to the initiation of a predetermined type of main program, such as speech.

There are many situations where it is desirable to coordinate sound material from one source with sound material from a reproducer. For example, in many retail stores, such as department stores or large grocery stores, it is desirable to reproduce momentarily recorded messages to the shoppers to point out special bargains or otherwise advertise goods which the management has special interest in moving. For maximum effectiveness these reproductions should be interspersed with music or other program material. The reproductions, of necessity, must be prepared for the particular store in which they are to be reproduced. On the other hand the interlude music or program material may be any convenient source of such material, such as an FM station.

When a separate program source is used for interlude material the problem arises of coordinating the reproduction of this material with the reproduction of the recorded advertising messages. It is necessary, in such an installation, that the recorded message interrupt the main program material when desired, that the recorded message be reproduced in its entirety without interruption, and that at the conclusion of the recorded message the reproduction of the program material resume.

In the present invention a control mechanism is provided which will automatically coordinate the reproduction of main program material with a recorded message. In brief, a reproducer, such as a tape reproducer, is provided to reproduce the secondary program material. The reproducer starts its operation when a pair of start terminals are momentarily connected and ceases operation when the program is concluded. The reproducer also has a pair of "sync" terminals across which a predetermined voltage condition exists during operation of the reproducer.

The control mechanism receives control voltage from the main program source. This control voltage may, for example, be obtained from a circuit on the main program reproducer which is responsive to the presence of speech as distinguished from music. A control relay in the control circuit is actuated in response to the control voltage to discharge a capacitor through a start relay. The start relay momentarily connects the start terminals and thereby initiates reproducer operation. A priority relay is energized from the "sync" terminals of the reproducer to connect the reproducer to output terminals leading to an amplifier and speaker when the reproducer is operating. This relay disconnects the reproducer and connects the main program source to the output terminals when the reproducer reaches the end of its program.

It is therefore a general object of the present invention to provide an automatic control mechanism responsive to a main program source and operative to reproduce a previously recorded message.

It is another object of the present invention to provide an automatic control mechanism to permit continuous reproduction, alternately, of a main program source and a recorded message so the entire recorded message can be reproduced without interruption from the main program source.

It is still another object of the present invention to provide an automatic control mechanism to permit reproduction of a main program, interruption of the program in response to material such as speech, to reproduce a recorded message in its entirety, and then resume the main program.

A further object of the present invention is to provide a control mechanism incorporating a priority relay responsive to sound reproducer operation to reproduce the entire message of the secondary reproducer once secondary reproducer operation is initiated.

Still another object of the present invention is to provide an improved control circuit to coordinate a main program source and a secondary source, which circuit is promptly conditioned for successive operations and provides a mechanism that momentarily actuates to initiate reproducer operation.

Additionally, it is an object of the present invention to provide a control device to coordinate reproduction of a program with reproduction of a recorded message, the device being of simple construction, capable of acting positively, reliable, easy and inexpensive to manufacture, and suitable for a wide variety of commercial applications.

The novel features which we believe to be characteristic of our invention are set forth with particularity in the appended claims. Our invention itself, however, both as to its organization and method of operation, together with further objects and advantages thereof, will best be understood by reference to the following description taken in conjunction with the accompanying drawings in which:

Figure 1:
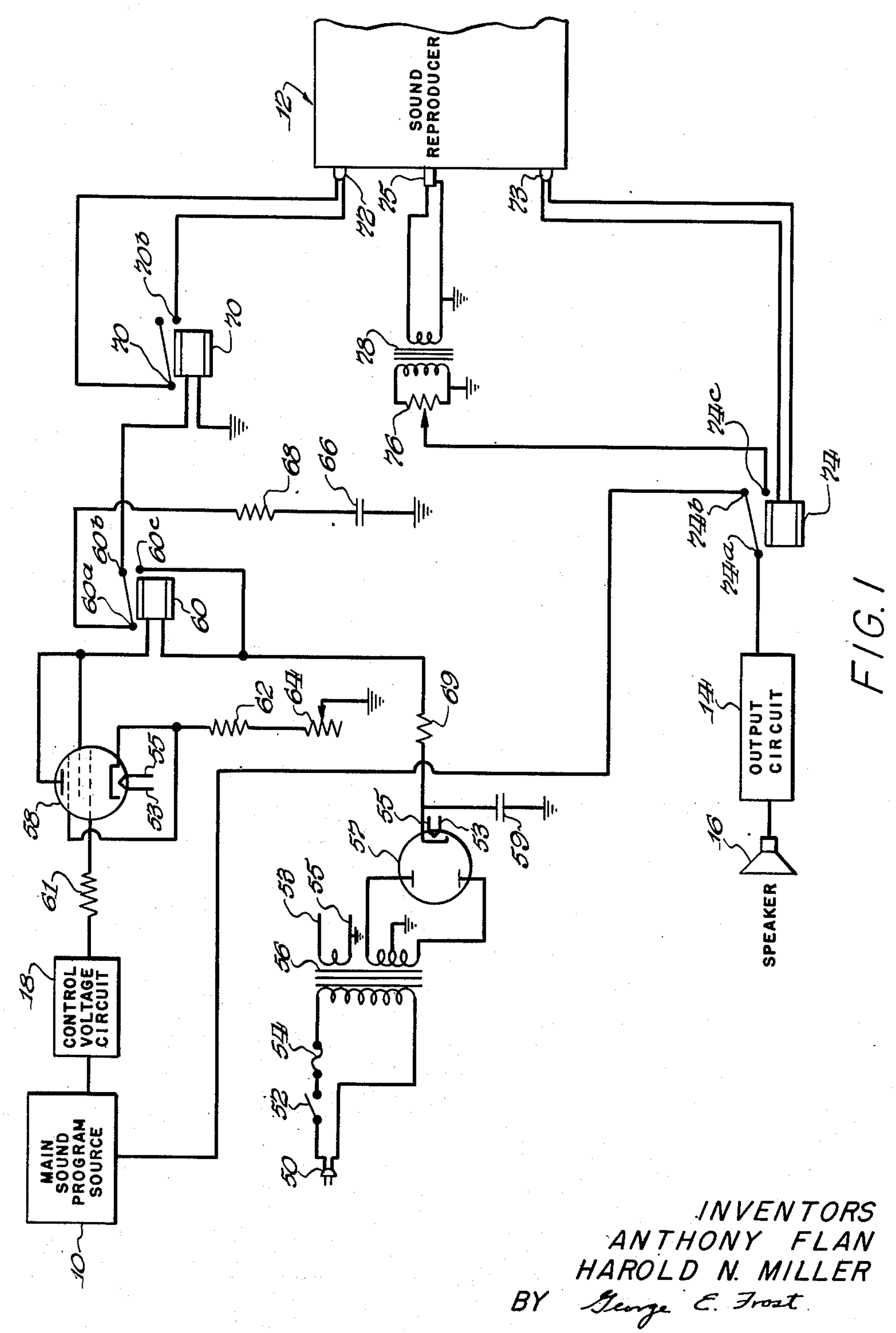
Figure 1 is a schematic circuit diagram of the control device of the present invention.

As shown in Figure 1 the control mechanism of the present invention is connected between a main sound program source, shown generally at 10, and a sound reproducer or secondary source, shown generally at 12. The control mechanism serves to connect these units alternately to an output circuit 14 and speaker 16 for audible reproduction. The main sound program source may, for example, be a radio receiver or a program fed into a place of business from a source providing such service. The main sound program source 10 has a circuit 18 to generate a control voltage in response to program material of a predetermined kind. The control voltage may be generated in response to a signal received by the main sound program source 10 or may be generated in response to the nature of the material received by the sound program source. For example, the circuit 18 may be any one of the well-known circuits which produce a unidirectional control voltage in response to speech signals from the main source 10.

Figure 2:
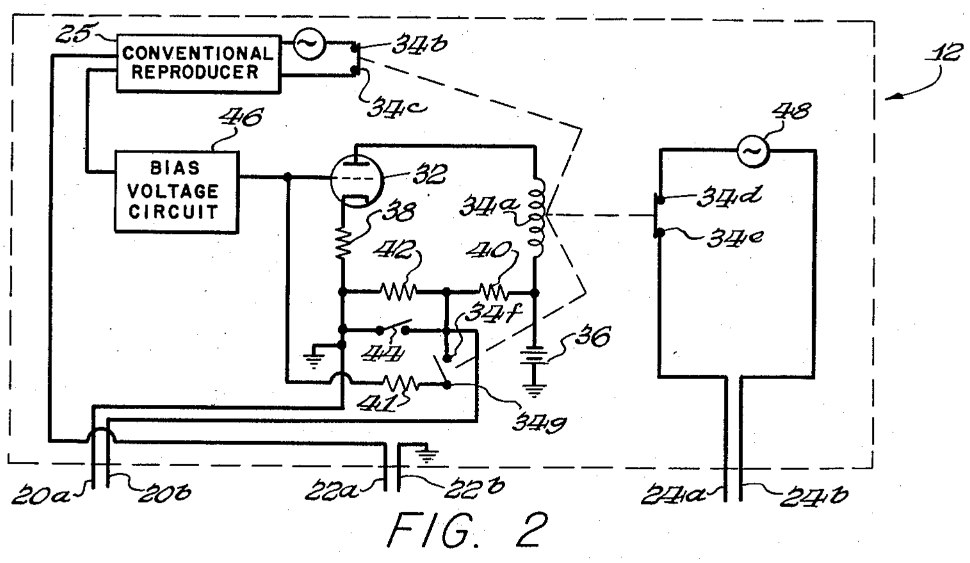
Figure 2 is a schematic circuit diagram of the reproducer.

The sound reproducer, shown generally at 12, may, for example, be a conventional tape recorder with the additional circuits and terminals as hereinafter described. As shown in Figure 2 the reproducer 12 has a pair of start terminals 20*a* and 20*b*, a pair of speaker terminals 22*a* and 22*b*, and a pair of "sync" voltage terminals 24*a* and 24*b*. The reproducer has conventional reproducer components 25 and, in addition, has a circuit to provide for starting on the momentary connection of the start terminals 20*a* and 20*b* and discontinuance of reproducer operation when the program is completed, and a circuit to provide a voltage across the "sync" terminals while the reproducer is in operation.

The circuit which provides for initiation of reproducer operation on the momentary connection of start terminals 20*a* and 20*b* and the subsequent discontinuance of operation is shown in Figure 2. The terminals 20*a* and 20*b* are connected to a circuit which includes the tube 32 and the operating coil 34*a* of a relay. The relay has a pair of normally closed contacts 34*b* and 34*c* in the reproducer drive circuit, a pair of normally closed contacts 34*d* and 34*e* in the "sync" circuit, and a pair of normally open contacts 34*f* and 34*g* in the start circuit. The current flows from a source of positive voltage 36 (shown diagrammatically as a battery) through the operating coil 34*a* of the relay to the anode of tube 32. The cathode of tube 32 connects through resistance 38 to ground. The high voltage side of the operating coil 34*a* is connected through resistance 40 and resistance 42 to ground, thus defining a point of intermediate potential at the junction of resistance 40 and resistance 42.

The start terminal 20*b* is connected to the junction of resistance 40 and resistance 42 while terminal 20*a* is connected to ground. Thus when terminals 20*a* and 20*b* are connected resistance 42 is short-circuited. This resistance can also be short-circuited by closing manual switch 44, but this switch is left open during automatic operation. The junction of resistance 40 and 42 is also connected through the normally open contacts 34*f* and 34*g* of the relay and resistance 41 to the grid of tube 32.

The grid of tube 32 is also connected to a bias voltage circuit 46. This latter circuit, which normally supplies a negative bias to the grid of tube 32, generates a positive voltage in response to a signal recorded at the end of the message being reproduced, to reduce the negative bias of the grid. In the absence of the positive voltage generated in response to the signal, the current flow is sufficiently small through the operating coil 34*a* to cause the switch elements of the relay to assume their normal positions. With the coil 34*a* deenergized the contacts 34*b* and 34*c* are closed, producing operation of the reproducer, and contacts 34*f* and 34*g* are open. Manual switch 34 is also open. When a positive voltage, produced in the bias voltage circuit 46, is impressed on the grid of tube 32 to reduce the negative bias, the current flowing through operating coil 34*a* is increased to actuate the relay switches. Contacts 34*b* and 34*c* are opened to stop operation of the reproducer and contacts 34*f* and 34*g* are closed. With the latter contacts closed a positive voltage from the junction of resistance 40 and resistance 42 is impressed on the grid of tube 32 to hold the grid positive in relation to the cathode, even after the positive voltage is no longer generated in circuit 46. Thus sufficient current continues to flow through the coil 34*a* to keep the relay energized.

When contacts 20*a* and 20*b* are momentarily connected, the resistance 42 is shorted out of the circuit and the difference in voltage between the junction of resistance 40 and resistance 42 and the cathode is consequently reduced. This reduces the difference in potential between the grid, which at this time is connected to the junction of resistance 40 and 42, and the cathode of tube 32 sufficiently to reduce the current flow in relay coil 34*a*. This deenergizes the relay coil 34*a* to close contacts 34*b* and 34*c*, initiating operation of the reproducer. Contacts 34*f* and 34*g* are opened to prevent the relatively positive voltage of the junction of resistances 40 and 42 from reaching the grid of tube 32.

The "sync" terminals 24*a* and 24*b* are connected to a source of alternating voltage 48 through the normally closed contacts 34*d* and 34*e*. When the reproducer is operating, and the operating coil 34*a* is consequently deenergized, the contacts 34*d* and 34*e* are closed to impress a voltage across the terminals 24*a* and 24*b*. When the reproducer is not in operation, and coil 34*a* is consequently energized, contacts 34*d* and 34*e* are open and no voltage exists across the terminals 24*a* and 24*b*.

The control circuit of the present invention is shown in Figure 1. Power is supplied from an A.-C. source (not shown) through plug 50, on-off switch 52, fuse 54, to the primary of transformer 56. The secondary of transformer 56 supplies voltage to the filaments of tube 57 and tube 58 through connections 53 and 55, and supplies power to the rectifier tube 57. D.-C. voltage from the rectifier 57 is supplied to the anode of control tube 58 through resistance 69 and control relay 60. The current from the rectifier 57 is filtered by capacitor 59. The cathode of control tube 58 is connected to ground through resistance 62 and variable resistance 64. The grid of the control tube is connected to the control voltage circuit 18, through resistance 61.

The control relay 60 has contacts 60*a*, 60*b*, and contact 60*c*. Contact 60*c* is connected to the high voltage side of relay 60. Contact 60*a* is connected to capacitor 66 through resistance 68 and contact 60*b* is connected to ground through start relay 70. Relay 70, normally open, has contacts 70*a* and 70*b* which are connected respectively to the start terminals 20*a* and 20*b* (see Figure 2) through plug 72.

The "sync" terminals 24*a* and 24*b* are connected respectively through plug 73, to terminals of relay 74. Relay 74 has contact 74*c*, connected through variable resistance 76 to the secondary of the matching transformer 78. The primary of transformer 78 is connected to the speaker terminals 22*a* and 22*b* (see Figure 2), through jack 75. Contact 74*b* of relay 74 is connected to the main sound program source 10 while contact 74*a* is connected to the output circuit 14.

In a unit constructed in accordance with the present invention the component parts may be as follows:

| | | |
|---|---|---|
| Resistance 38 | ohms | 1,500 |
| Resistance 40 | do | 100,000 |
| Resistance 41 | megohms | 1 |
| Resistance 42 | ohms | 6,800 |
| Resistance 61 | do | 820,000 |
| Resistance 62 | do | 1,200 |
| Resistance 64 | do | 200 |
| Resistance 68 | do | 15,000 |
| Resistance 76 | do | 200,000 |
| Resistance 161 | do | 820,000 |
| Resistance 165 | megohms | 3.9 |
| Capacitor 66 | microfarads | 16 |
| Capacitor 167 | do | 1 |
| Tube 32 | | 6AU6 |
| Tube 57 | | 6X4 |
| Tube 58 | | 6AU6 |
| Tube 158 | | 6AU6 |
| Normal voltage from source 36 | volts D.-C. | 300 |
| Normal voltage from rectifier 57 | do | 300 |
| Normal voltage across 53 and 55 | volts A.-C. | 6.3 |
| Voltage at "sync" terminals when reproducer in operation | volts | 115 |

In the operation of the circuit shown in Figure 1 sufficient current will flow through control tube 58 and relay 60 to connect the contacts 60*a* and 60*c* when no control voltage is fed to the grid of the control tube 58. Since contact 60*c* of relay 60 is connected to the high voltage side of relay 60 the capacitor 66 becomes charged. The resistance 68 limits the current flowing to the capacitor and prolongs its life. At this time the reproducer 12 is not in operation and the relay 74 is deenergized. The normally closed contacts 74*a* and 74*b* are connected and the output circuit 14 and speaker 16 are connected to the main sound program source 10 for reproduction.

When a negative control voltage is supplied to the grid of control tube 58 in response to program material from source 10 of a predetermined nature, the current flowing through the tube and the relay 60 will be reduced sufficiently to actuate the switch elements of relay 60 to disconnect contacts 60*a* and 60*c* and connect contacts 60*a* and 60*b*. This will discharge the capacitor 66 through start relay 70 to ground. This supplies a sufficient current through start relay 70 to close the normally open contacts and connect contacts 70*a* and 70*b*. Relay 70 remains energized only until capacitor 66 is discharged, a period of time determined by the charge on capacitor 66. Thus, the normally open start terminals 20*a* and 20*b* are momentarily closed while capacitor 66 is discharged and again opened after the capacitor 66 is discharged. The length of time the contacts are closed is therefore independent of the duration of the control signal. This permits the reproducer to start operation, reproduce its program, and stop operation at the conclusion of its program even though the control signal is still present in the control circuit.

The momentary connecting of terminals 20*a* and 20*b* will initiate the operation of the reproducer. Simultaneously, with the initiation of reproducer operation a voltage is impressed across the "sync" terminals 24*a* and 24*b* and hence across the terminals of relay 74. This actuates the relay 74, connecting the speaker terminals 22*a* and 22*b* of the sound reproducer 12 to the output circuit 14 and speaker 16 and disconnecting the main sound program source 10. At this time the recorded material on the reproducer is audibly reproduced.

When the recorded message is completed the voltage across "sync" terminals 24*a* and 24*b* is removed in response to a recorded signal at the end of the recorded message. This removes the voltage across relay 74 and actuates the switch elements of the relay to connect the output circuit 14 and speaker 16 to the main sound program source 10 for resumption of main program source reproduction.

Figure 3:
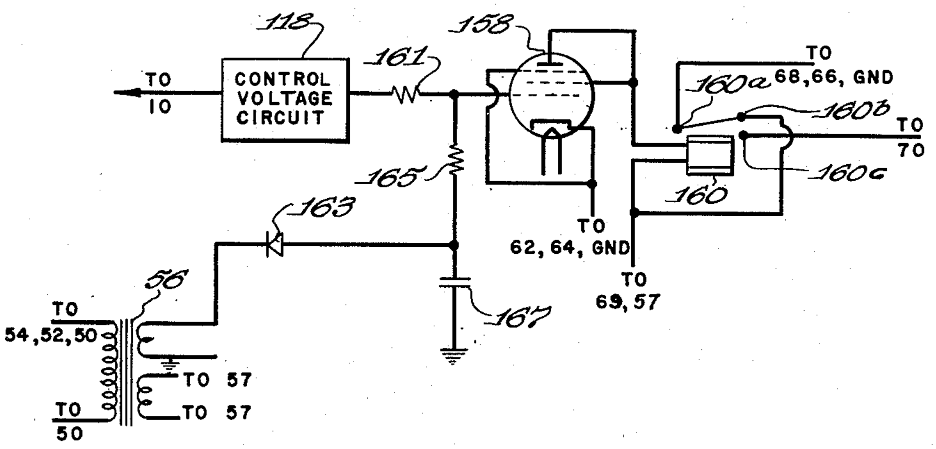
Figure 3 is a schematic circuit diagram showing a modification of the control device circuit.

A modification of the present invention is shown in Figure 3. In this modification the control tube 158 receives voltage from a rectifier tube similar to tube 57 of Figure 1. Similarly, the cathode of tube 158 is connected to ground. A relay 160 is connected in the circuit in the same manner as relay 60 of Figure 1.

The relay 160 has contacts 160*a*, 160*b* and 160*c*. In this modification the contact 160*a* is connected to a capacitor similar to capacitor 66 of Figure 1, while contact 160*b* is connected to the high voltage side of relay 160. Contact 160*c* is connected to a start relay similar to relay 70 of Figure 1. A negative bias voltage is supplied to the grid of control tube 158 from the secondary of transformer 56 through rectifier 163 and isolating resistor 165. The current is filtered by capacitor 167. The grid of tube 158 is also connected to control voltage circuit 118 which generates a positive voltage in response to a signal or predetermined program material, in the main program source 10. The other parts of the circuit are similar to the circuit of Figure 1.

In this modification reduced current will flow through the tube 158 and the relay 160 in the absence of the positive control voltage generated in the control voltage circuit 118 and supplied through resistance 161 to the grid of 158. At this time relay 160 is deenergized and contacts 160*a* and 160*b* are connected to charge the capacitor. When a positive voltage from the control voltage circuit 118 is impressed on the grid of tube 158 in response to program material of a predetermined kind, increased current will flow through the tube 158. This will energize the relay 160, connecting contacts 160*a* and 160*c*. Thus at this time the capacitor will be discharged through the start relay to close the contacts of the relay in a manner similar to the circuit of Figure 1.

While we have shown and described a specific embodiment of the present invention it will, of course, be understood that numerous modifications and alternative constructions may be made without departing from the true spirit and scope thereof. We therefore intend by the appended claims to cover all such modifications and alternative constructions as fall within their true spirit and scope.

What we claim as new and desire to secure by Letters Patent of the United States is:

1. A control device operable to supply signal to an output circuit from a sound reproducer in coordination with a sound program source, the sound program source having means to generate a predetermined negative control voltage in response to program material of a predetermined kind and the sound reproducer having start terminals operable when connected momentarily to initiate a reproducer program of predetermined duration and a second set of terminals across which predetermined voltage exists when the reproducer is in operation, the control device comprising: a control relay having a pair of normally closed and a pair of normally open contacts; means to energize the control relay in the absence of negative control voltage; a capacitor; means to charge said capacitor through the normally open contacts of the control relay; a start relay having an operating coil and a pair of normally open contacts; means connecting the operating coil of the start relay to the capacitor through the normally closed contacts of the control relay, whereby the start relay is momentarily energized in response to said negative control voltage; means connecting the contacts of the start relay to the start terminals of the reproducer; a priority relay having a pair of normally open and a pair of normally closed contacts; and means connecting the priority relay to said second set of terminals of the sound reproducer whereby the sound reproducer is connected to the output circuit through the normally open contacts when the predetermined voltage exists across said second set of terminals of the reproducer and the output circuit is connected to the program source through the normally closed contacts when the predetermined voltage is removed from said second set of terminals of the reproducer.

2. A control device operable to supply signal to an output circuit from a sound reproducer in coordination with a sound program source, the sound program source having means to generate a predetermined positive control voltage in response to program material of a predetermined kind and the sound producer having start terminals operable when connected momentarily to initiate a reproducer program of predetermined duration and a second set of terminals across which predetermined voltage exists when the reproducer is in operation, the control device comprising: a control relay having a pair of normally closed and a pair of normally open contacts; means to energize the control relay when the positive control voltage is generated by the sound program source; a capacitor; means to charge said capacitor through the normally closed contacts of the control relay; a start relay having an operating coil and a pair of normally open contacts; means connecting the start relay to the capacitor through the normally open contacts of the control relay, whereby the start relay is momentarily energized in response to said positive control voltage; means connecting the contacts of the start relay to the start terminals of the reproducer; a priority relay having a pair of normally open and a pair of normally closed contacts; and means connecting the priority relay to said second set of terminals of the sound reproducer whereby the sound reproducer is connected to the output circuit through the normally open contacts when the predetermined voltage exists across said second set of terminals of the reproducer and the output circuit is connected to the program source through the normally closed contacts when the predetermined voltage is removed from said second set of terminals of the reproducer.

3. An automatic control mechanism operable to supply signal to an output circuit from a sound reproducer in coordination with a sound program source, the sound reproducer having start terminals operable when connected momentarily to initiate a reproducer program of predetermined duration and a second set of terminals across which a predeterminel voltage condition exists when the reproducer is in operation, and the sound program source having means to generate a predetermined control voltage in response to program material of a predetermined kind, the control mechanism comprising: a start relay including an operating coil and switch elements; means connecting the switch elements of the start relay to the start terminals of the reproducer whereby the start terminals are momentarily connected when the operating coil of the start relay is momentarily energized; a capacitor; means connecting the capacitor to the operating coil of the start relay whereby the coil is momentarily energized by discharge of the capacitor; a control circuit carrying current regulated by the control voltage generated by the sound program source; switch means connected to the control circuit operable in response to the flow of current in the control circuit selectively to charge the capacitor when no control voltage is generated by the program source and to discharge the capacitor through the operating coil of the start relay when the control voltage is generated; and switch means responsive to the predetermined voltage condition across said second set of terminals in the reproducer selectively operable to connect the output of the reproducer to said output circuit for the period of reproducer operation and to connect the sound program source to said output circuit when the reproducer is not in operation.

4. An automatic control mechanism operable to supply signal to an output circuit from a sound reproducer in coordination with a sound program source, the source having means to generate a predetermined control voltage in response to program material of a predetermined kind, the control mechanism comprising: means to produce a predetermined voltage condition in the reproducer during operation of the same; means to arrest operation of the reproducer at a predetermined time after operation has begun; relay means including an operating coil and switch elements; means to initiate operation of the reproducer when the said switch elements are momentarily closed; a capacitor; means connecting the capacitor to said operating coil to close the switch elements momentarily when the capacitor is discharged through the coil; switch means selectively operable in response to the control voltage of the sound program source to charge the capacitor when no control voltage is generated by the program source and to discharge the capacitor through the relay coil when the control voltage is generated by the program source; and switch means responsive to the predetermined voltage condition in the reproducer selectively operable to connect the output of the reproducer to said output circuit for the period of reproducer operation and to connect the sound program source to said output circuit when the reproducer is not in operation.

5. A control device operable to supply signal to an output circuit from a sound reproducer in coordination with a sound program source, the sound program source having means to generate a predetermined control voltage in response to program material of a predetermined kind and the sound reproducer having start terminals operable when connected momentarily to initiate a reproducer program of predetermined duration and a second set of terminals across which a predetermined voltage condition exists when the reproducer is in operation, the control device comprising: switch means operable when actuated to connect the start terminals of the sound reproducer momentarily; means responsive to the control voltage generated by the sound program source to actuate the switch means; and switch means responsive to the predetermined voltage condition across said second set of terminals of the reproducer selectively operable to connect the output of the reproducer to said output circuit for the period of reproducer operation and to connect the sound program source to said output circuit when the reproducer is not in operation.

No references cited.